(12) United States Patent
Yamashita et al.

(10) Patent No.: US 11,511,754 B2
(45) Date of Patent: Nov. 29, 2022

(54) SEAT DETERMINING APPARATUS, SEAT DETERMINING METHOD, AND COMPUTER PROGRAM FOR DETERMINING SEAT

(71) Applicant: TOYOTA JIDOSHA KABUSHIKI KAISHA, Toyota (JP)

(72) Inventors: Keiji Yamashita, Nisshin (JP); Koichi Ikemoto, Nagoya (JP); Koji Taguchi, Sagamihara (JP); Shin Sakurada, Toyota (JP); Tomoyuki Kuriyama, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 234 days.

(21) Appl. No.: 16/561,578

(22) Filed: Sep. 5, 2019

(65) Prior Publication Data

US 2020/0164887 A1    May 28, 2020

(30) Foreign Application Priority Data

Nov. 26, 2018   (JP) .............................. JP2018-220535

(51) Int. Cl.
*B60W 40/08* (2012.01)
*G01C 21/34* (2006.01)
*B60W 40/02* (2006.01)

(52) U.S. Cl.
CPC ........... *B60W 40/08* (2013.01); *G01C 21/343* (2013.01); *G01C 21/3438* (2013.01);
(Continued)

(58) Field of Classification Search
CPC ......... B60W 40/08; B60W 2040/0881; B60W 40/02; G01C 21/343; G01C 21/3438; G01C 21/34
See application file for complete search history.

(56) References Cited

U.S. PATENT DOCUMENTS 3,730,583 A * 5/1973 Golovas ............... B62D 47/003
                                                296/64
6,184,785 B1 * 2/2001 Midorikawa ..... B60R 21/01546
                                                280/804

(Continued)

FOREIGN PATENT DOCUMENTS

JP      2004-62490 A    2/2004
JP      2017-182137 A   10/2017
WO      2018/142528 A1  8/2018

*Primary Examiner* — Hunter B Lonsberry
*Assistant Examiner* — Jay Khandpur
(74) *Attorney, Agent, or Firm* — Sughrue Mion, PLLC (57) ABSTRACT

A seat determining apparatus includes a travel route determining unit configured to determine a travel route of a vehicle such that the travel route runs by way of a scheduled boarding point and scheduled alighting point of each of a plurality of users scheduled to ride the vehicle, the scheduled boarding point being a point at which the user is scheduled to get on the vehicle, the scheduled alighting point being a point at which the user is scheduled to get off the vehicle; a boarding and alighting order determining unit configured to determine alighting order, in which the users get off the vehicle, based on the travel route and the scheduled alighting point of each of the users; and a seat determining unit configured to determine a seat according to the alighting order for each of the users when each of the users rides the vehicle.

19 Claims, 7 Drawing Sheets

(52) U.S. Cl.
CPC ..... *B60W 40/02* (2013.01); *B60W 2040/0881* (2013.01); *G01C 21/34* (2013.01)

(56) References Cited

U.S. PATENT DOCUMENTS

| | | | |
|---|---|---|---|
| 7,296,825 B1 * | 11/2007 | Zia | B60R 22/48 |
| | | | 180/268 |
| 2019/0103028 A1 | 4/2019 | Kobayashi et al. | |
| 2020/0070715 A1 * | 3/2020 | Krause | B60R 25/20 |
| 2020/0111370 A1 * | 4/2020 | Dyer | H04W 4/38 |
| 2020/0132469 A1 * | 4/2020 | Mehta | G06Q 10/047 |
| 2020/0226497 A1 * | 7/2020 | Hirose | G06Q 10/04 |

\* cited by examiner

SEAT DETERMINING APPARATUS, SEAT DETERMINING METHOD, AND COMPUTER PROGRAM FOR DETERMINING SEAT

INCORPORATION BY REFERENCE

The disclosure of Japanese Patent Application No. 2018-220535 filed on Nov. 26, 2018 including the specification, drawings and abstract is incorporated herein by reference in its entirety.

BACKGROUND

1. Technical Field

The disclosure relates to a seat determining apparatus, seat determining method, and computer program for determining a seat, which determine a seat of a user who rides a vehicle that is used for a mobility service.

2. Description of Related Art

A technique using vehicles under autonomous driving control has been suggested for vehicles that are used in mobility services, such as taxi services and ride-sharing services (see, for example, Japanese Unexamined Patent Application Publication No. 2017-182137 (JP 2017-182137 A)).

For example, in a demand service system described in JP 2017-182137 A, a service management center creates a service plan within an allowable range of a reference service schedule based on a usage request from a user terminal and the reference service schedule, and provides the created service plan to a demand vehicle and a user terminal. In the reference service schedule, a service route, a start point departure time, and an end point arrival time are set in advance. On the other hand, the demand vehicle runs in accordance with the created service plan.

SUMMARY

A plurality of users may ride a vehicle that is used for a mobility service. In such a case, if the users sit at arbitrary seats, any one of the users can be required to pass in front of the other user(s) sitting on the seat when the any one of the users moves to a door to get off the vehicle, which may interfere with the action of getting off.

It is an object of the disclosure to provide a seat determining apparatus that, when any one of a plurality of users riding in a vehicle gets off, allows the user to easily get off.

An aspect of the disclosure provides a seat determining apparatus. The seat determining apparatus includes a travel route determining unit configured to determine a travel route of a vehicle such that the travel route runs by way of a scheduled boarding point and scheduled alighting point of each of a plurality of users scheduled to ride the vehicle, the scheduled boarding point being a point at which the user is scheduled to get on the vehicle, the scheduled alighting point being a point at which the user is scheduled to get off the vehicle; a boarding and alighting order determining unit configured to determine alighting order, in which the plurality of users gets off the vehicle, based on the travel route and the scheduled alighting point of each of the plurality of users; and a seat determining unit configured to determine a seat according to the alighting order for each of the plurality of users when each of the plurality of users rides the vehicle.

In the seat determining apparatus, the seat determining unit may be configured to determine a seat for each of the plurality of users according to the alighting order such that, when any one of the plurality of users gets off the vehicle, the any one of the plurality of users does not cut across in front of a seat for another one of the plurality of users.

In this case, the boarding and alighting order determining unit may be configured to further determine boarding order, in which the plurality of users gets on the vehicle, based on the travel route and the scheduled boarding point of each of the plurality of users, and the seat determining unit may be configured to, when the boarding order and the alighting order indicate that, of the plurality of users, a second user who gets on the vehicle earlier than a first user gets off the vehicle later than the first user, determine a seat for each of the plurality of users such that a seat for the first user is closer to a door of the vehicle, which the first user and the second user use to get off the vehicle, than a seat for the second user.

Alternatively, the boarding and alighting order determining unit may be configured to further determine boarding order, in which the plurality of users gets on the vehicle, based on the travel route and the scheduled boarding point of each of the plurality of users, and the seat determining unit may be configured to, when the boarding order and the alighting order indicate that, of the plurality of users, a second user who gets on the vehicle earlier than a first user gets off the vehicle earlier than the first user, determine a seat for each of the plurality of users such that a path from a door of the vehicle, which the first user and the second user use to get off the vehicle, to a seat for the first user is different from a path from the door to a seat for the second user.

Alternatively, the vehicle may have a plurality of doors, the seat determining unit may be configured to, when each of the plurality of users is allowed to use a different one of the plurality of doors to get off the vehicle, determine a seat for each of the plurality of users such that each of the plurality of users gets off from a different one of the plurality of doors, and the seat determining unit may be configured to, when each of the plurality of users is allowed to use only the same one of the plurality of doors to get off the vehicle, determine a seat for each of the plurality of users such that, when any one of the plurality of users gets off the vehicle according to the alighting order, the any one of the plurality of users does not cut across in front of a seat for another one of the plurality of users.

The seat determining apparatus may be mounted on the vehicle. In this case, the seat determining apparatus may further include a notification unit configured to, when each of the plurality of users gets on the vehicle, inform the user of a seat for the user.

Another aspect of the disclosure provides a seat determining method. The seat determining method includes determining a travel route of a vehicle such that the travel route runs by way of a scheduled boarding point and scheduled alighting point of each of a plurality of users scheduled to ride the vehicle, the scheduled boarding point being a point at which the user is scheduled to get on the vehicle, the scheduled alighting point being a point at which the user is scheduled to get off the vehicle; determining alighting order, in which the plurality of users gets off the vehicle, based on the travel route and the scheduled alighting point of each of the plurality of users; and determining a seat according to the alighting order for each of the plurality of users when each of the plurality of users rides the vehicle.

Further another aspect of the disclosure provides a computer program for determining a seat. The computer program for determining a seat causes a computer to execute instructions for determining a travel route of a vehicle such that the travel route runs by way of a scheduled boarding point and scheduled alighting point of each of a plurality of users scheduled to ride the vehicle, the scheduled boarding point being a point at which the user is scheduled to get on the vehicle, the scheduled alighting point being a point at which the user is scheduled to get off the vehicle; determining alighting order, in which the plurality of users gets off the vehicle, based on the travel route and the scheduled alighting point of each of the plurality of users; and determining a seat according to the alighting order for each of the plurality of users when each of the plurality of users rides the vehicle.

With the seat determining apparatus according to the disclosure, such an advantageous effect that, when any one of a plurality of users riding in the vehicle gets off, the user can easily get off is obtained.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, a seat determining apparatus and a vehicle dispatch management system will be described with reference to the accompanying drawings. The seat determining apparatus determines seats for a plurality of users, in a vehicle, when the users whose boarding points and alighting points are different, such that the users can ride together in a vehicle, e.g., ride sharing. At this time, the seat determining apparatus determines seats for the users based on the order in which the users get on the vehicle (hereinafter, simply referred to as boarding order) and the order in which the users get off the vehicle (hereinafter, simply referred to as alighting order) such that, when the users get off the vehicle, each user does not cut across in front of a seat for another one of the users (that is, each user does not pass in front of a seat on which another one of the users is seated). Thus, the seat determining apparatus allows any one of a plurality of users riding in the vehicle to easily get off when the any one of the users gets off.

Figure 1:
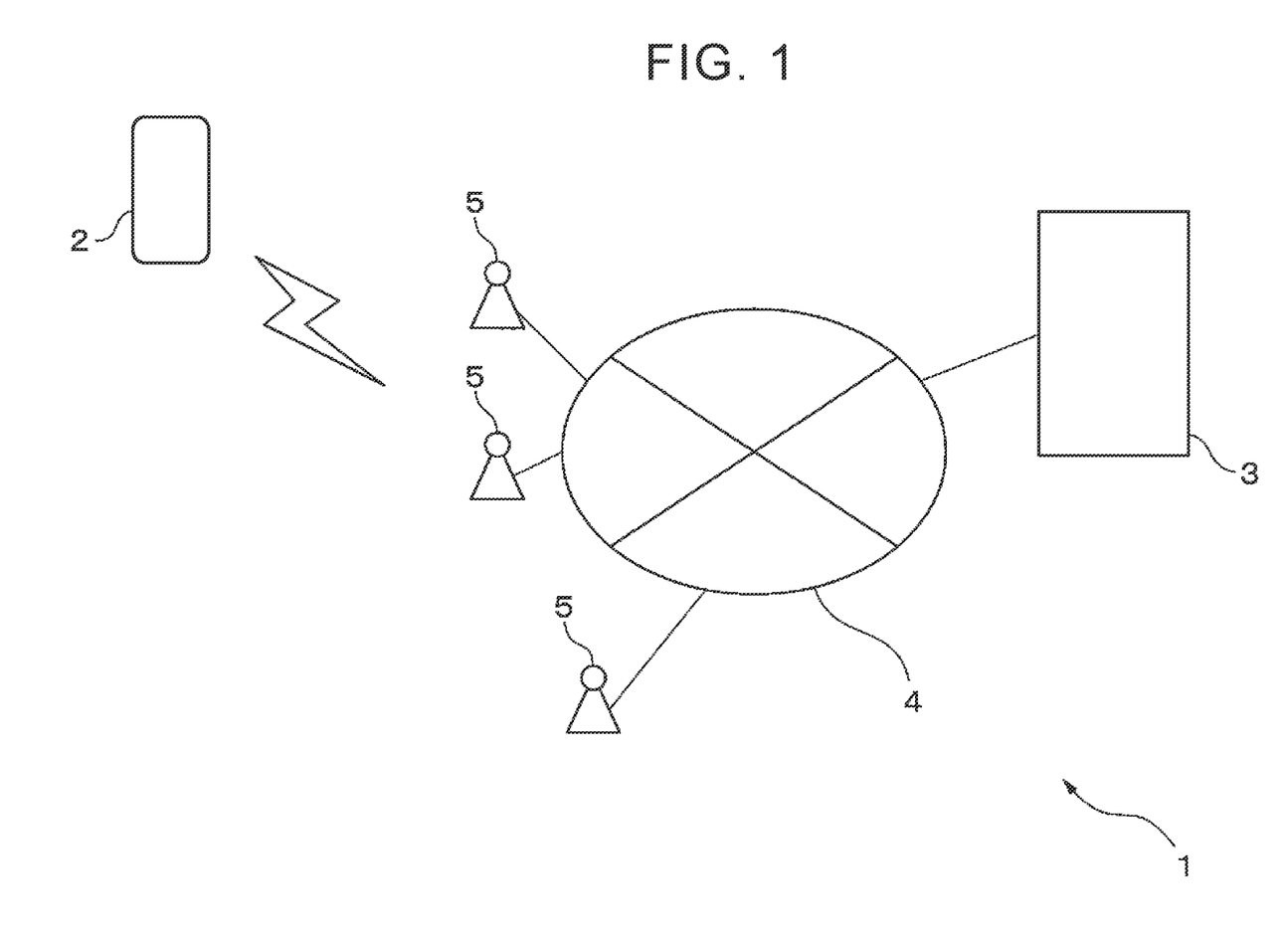
FIG. 1 is a schematic configuration diagram of a vehicle dispatch management system in which a seat determining apparatus according to an embodiment is implemented.

FIG. 1 is a schematic configuration diagram of the vehicle dispatch management system in which the seat determining apparatus according to an embodiment is implemented. The vehicle dispatch management system 1 includes a vehicle 2 and a server 3. The vehicle 2 has a plurality of seats. A plurality of users can ride the vehicle 2. The server 3 is an example of the seat determining apparatus. FIG. 1 shows one vehicle 2; however, the number of the vehicles 2 included in the vehicle dispatch management system 1 is not limited to one, and the vehicle dispatch management system 1 may include a plurality of the vehicles 2. The vehicle 2 receives a vehicle dispatch instruction from the server 3 via a communication network 4 and a wireless base station 5. The communication network 4 is made up of optical communication lines, or others. The wireless base station 5 is connected to the communication network 4 via a gateway (not shown). The vehicle dispatch instruction contains information on a travel route, a scheduled boarding point(s), scheduled alighting point(s), seat(s), and others, of one or more users to ride the vehicle 2. The vehicle 2 moves to the scheduled boarding point of each user and picks up the user on a one-by-one basis in accordance with the vehicle dispatch instruction. At this time, the vehicle 2 guides the user for a designated seat to seat the user at the designated seat. Then, the vehicle 2 transports the users from the scheduled boarding points of the users to the scheduled alighting points of the users. The server 3 is, for example, connected to the communication network 4 via a gateway (not shown). The server 3 determines a seat(s) for one or more users based on the scheduled boarding point(s) and scheduled alighting point(s) of the one or more users scheduled to ride the vehicle 2. The server 3 transmits a vehicle dispatch instruction to the vehicle 2 via the communication network 4 and the wireless base station 5. The vehicle dispatch instruction contains information on a travel route, and the scheduled boarding point(s), scheduled alighting point(s), seat(s), and others, of the one or more users to ride the vehicle 2.

The vehicle dispatch management system 1 may further include one or more mobile terminals (not shown) that are able to communicate with the server 3 via the wireless base station 5 and the communication network 4. Such mobile terminals may be, for example, cellular phones that the users who use the vehicle 2 carry. Each mobile terminal transmits a vehicle dispatch request to the server 3 via the wireless base station 5 and the communication network 4 in accordance with user's operation. The vehicle dispatch request contains the identification information of the user, the scheduled boarding point and scheduled alighting point (that is, destination) of the user, and others.

Figure 2A:
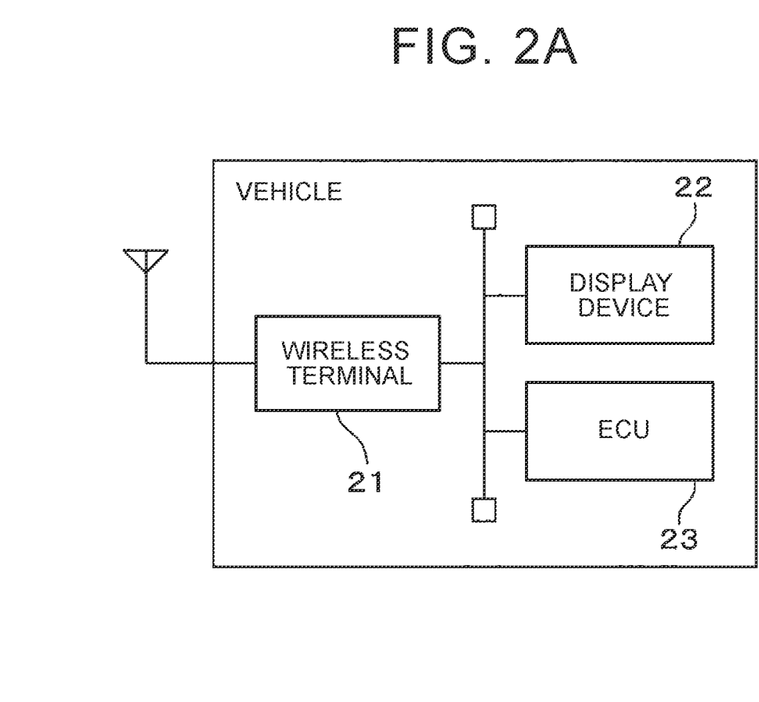
FIG. 2A is a schematic configuration diagram of a control system concerned with a seat determining process for a vehicle.
Figure 2B:
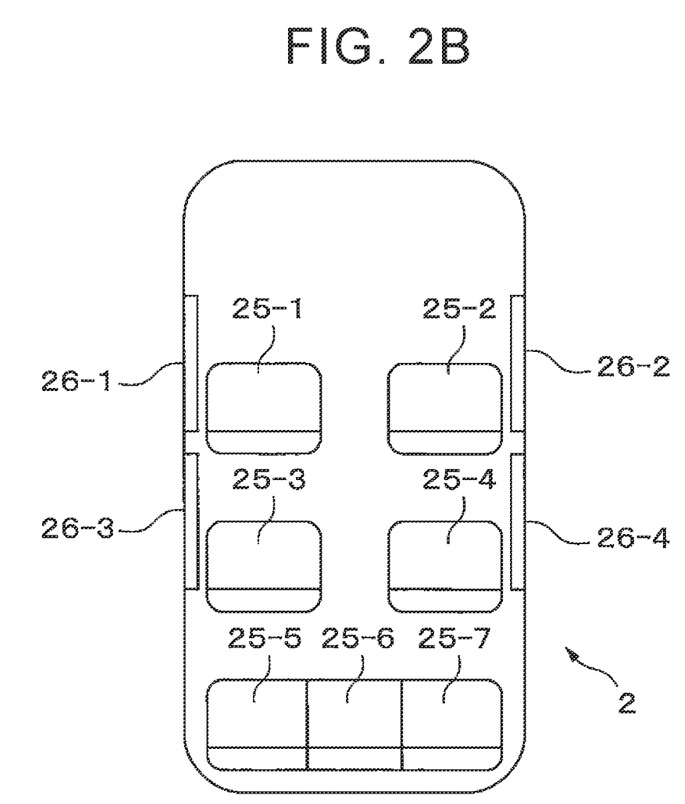
FIG. 2B is a diagram that shows an example of seating arrangement in a vehicle cabin of a vehicle.

FIG. 2A is a schematic configuration diagram of a control system concerned with a seat determining process for the vehicle 2. FIG. 2B is a view that shows an example of seat arrangement in a vehicle cabin of the vehicle 2. The vehicle 2 may be a vehicle under autonomous driving control. The vehicle 2 includes, for example, a wireless terminal 21, a display device 22, and an electronic control unit (ECU) 23. The wireless terminal 21 has a wireless communication function and is able to communicate with the wireless base station 5. The display device 22 is used to display various pieces of information for users in the vehicle cabin. the ECU 23 executes autonomous driving control over the vehicle and controls various components of the vehicle. The display device 22 is an example of a notification unit for, when a user gets on the vehicle 2, informing the user of a seat for the user. The wireless terminal 21 and the display device 22 are, for example, communicably connected to the ECU 23 via an in-vehicle network that conforms with the specifications of a controller area network (CAN) or others, provided in the vehicle 2. The ECU 23 includes, for example, at least one processor, a memory circuit, and a communication interface for communicating with various components of the vehicle 2. The vehicle 2 may further include a positioning device (not shown) that measures the position of the host vehicle, an outside sensor (not shown) for acquiring information around the vehicle 2, a storage device (not shown) that stores map information, and a navigation system (not shown) that obtains a travel route from a current position of the vehicle 2 to a destination. The positioning device may include, for example, a receiver that receives global positioning system (GPS) signals and a computing circuit that calculates the position of the vehicle from the GPS signals. The outside sensor may be, for example, a camera provided so as to capture an image around the vehicle 2 or a radar or LIDAR sensor for detecting a distance to an object present around the vehicle 2.

A plurality of seats on which users can sit is provided in the vehicle cabin of the vehicle 2. In the example shown in FIG. 2B, seven seats 25-1, 25-2, 25-3, 25-4, 25-5, 25-6, 25-7 disposed in three rows along the travel direction of the vehicle 2 and oriented forward of the vehicle 2 are provided. The number of seats of the vehicle 2 is not limited to seven. Alternatively, the number of seats of the vehicle 2 may be four, five, eight, or more. Any of the seats that are provided in the vehicle 2 may be oriented in a direction perpendicular to the travel direction of the vehicle 2 or oriented rearward of the vehicle 2. At least one of the plurality of seats that are provided in the vehicle 2 may be movable backward and forward along the travel direction of the vehicle 2. In addition, at least one of the plurality of seats that are provided in the vehicle 2 may be movable along the direction perpendicular to the travel direction of the vehicle 2. For example, the seats 25-1, 25-2, 25-3, 25-4 other than the seats in the last row may be movable backward and forward along the travel direction of the vehicle 2.

The vehicle 2 has one or more doors. In the example shown in FIG. 2B, four doors 26-1, 26-2, 26-3, 26-4 are provided. The door 26-1 is provided to the left of the left-side seat 25-1 in the front row. The door 26-2 is provide to the right of the right-side seat 25-2 in the front row. The door 26-3 is provided to the left of the left-side seat 25-3 in the second row. The door 26-4 is provided to the right of the right-side seat 25-4 in the second row. A user who sits on the seat 25-1 and a user who sits on the seat 25-2 can use the door 26-1 or the door 26-2 to get on or get off the vehicle 2. A user who sits on any of the seats 25-3, 25-4, 25-5, 25-6, 25-7 can use the door 26-3 or the door 26-4 to get on or get off the vehicle 2. A light source (not shown) for illuminating a seat may be provided for each of the plurality of seats in the vehicle cabin of the vehicle 2. The light source is another example of the notification unit. A seating sensor for sensing that a user has been seated may be provided for each of the seats of the vehicle 2.

In the vehicle 2, the ECU 23 executes autonomous driving control over the vehicle 2 such that the vehicle 2 moves to the scheduled boarding point of a user who gets on next or the scheduled alighting point of a user who gets off next along a travel route informed from the server 3 via the wireless terminal 21. As the vehicle 2 reaches the scheduled boarding point of a user who gets on next, the ECU 23 prompts the user to get on by opening any one of the doors, for example, the door closest to the seat designated for the user. The ECU 23 informs the user of the seat designated for the user and informed from the server 3 via the wireless terminal 21. For example, the ECU 23 displays information that indicates the seat for the user (for example, seat arrangement in the vehicle cabin and an arrow or the like that indicates the seat) on the display device 22 provided in the vehicle cabin. When a light source that illuminates a seat is provided for each seat, the ECU 23 may inform a user who gets on next of a seat by turning on the light source associated with the seat designated for the user and turning off the other light sources. Alternatively, the ECU 23 may inform a user of a designated seat by increasing space at the designated seat, for example, by sliding the designated seat rearward or sliding forward a seat located forward of the designated seat.

When the ECU 23 senses that a user has got on at a scheduled boarding point informed from the server 3, the ECU 23 may transmit a signal that represents that the user has got on and the position of the vehicle 2 when the user has got on, measured by the positioning device, to the server 3 via the wireless terminal 21 together with the identification information of the vehicle 2. Similarly, when the ECU 23 senses that a user riding in the vehicle 2 has got off, the ECU 23 may transmit a signal that represents that the user has got off (that is, provision of a mobility service is finished) and the position of the vehicle 2 when the user has got off, measured by the positioning device, to the server 3 via the wireless terminal 21 together with the identification information of the vehicle 2. The ECU 23 may transmit the current position of the vehicle 2, measured by the positioning device, to the server 3 via the wireless terminal 21 together with the identification information of the vehicle at predetermined intervals (for example, at intervals of 30 seconds, one minute, or five minutes). As the vehicle 2 reaches the scheduled alighting point of any one of users, the ECU 23 may automatically unfasten the seatbelt of the seat for the user.

For example, when the seating sensor senses that a user has sit on any one of the seats, the ECU 23 determines that the user has got on. Similarly, when the seating sensor does not sense a user seated on any one of the seats, the ECU 23 determines that the user has got off. The seating sensor may be, for example, a pressure sensor provided on a seating surface of a seat or an optical sensor in which a light source such as an infrared LED and a detector that receives light emitted from the light source are disposed to face each other across a seated user.

The server 3 is, for example, connected to the communication network 4 via, for example, a gateway (not shown). The server 3, for example, determines a travel route of the vehicle 2 in accordance with a vehicle dispatch request received from the mobile terminal of each of one or more users such that the vehicle 2 travels by way of the scheduled boarding point and scheduled alighting point of each user. The server 3 determines seats for users who ride the vehicle 2 based on the boarding order and alighting order of the users, which are determined in accordance with the travel route. The server 3 transmits a vehicle dispatch instruction to the vehicle 2 via the communication network 4 and the wireless base station 5. The vehicle dispatch instruction contains information that represents the scheduled boarding points and scheduled alighting points of users scheduled to ride the vehicle 2, a travel route, the seats for the users, and others.

Figure 3:
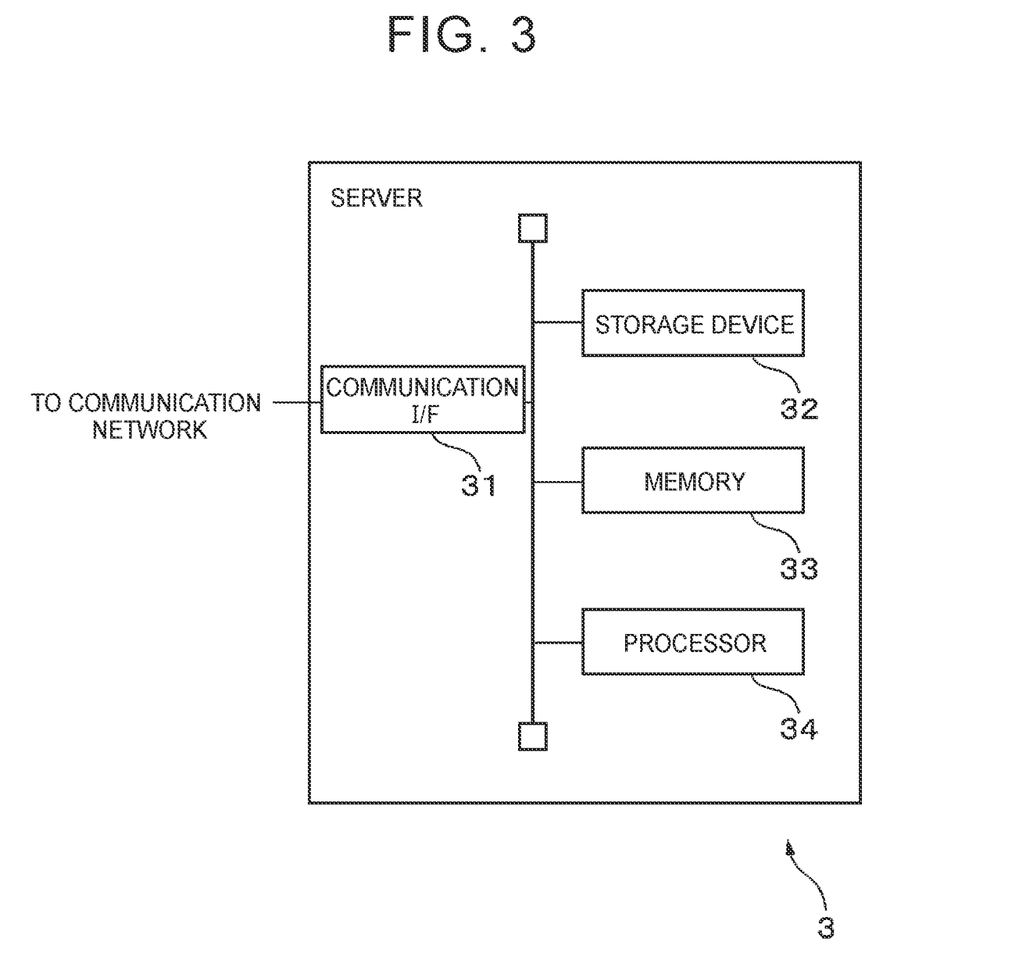
FIG. 3 is a schematic configuration diagram of a server that is an example of the seat determining apparatus.

FIG. 3 is a schematic configuration diagram of the server 3 that is an example of the seat determining apparatus. The server 3 includes a communication interface 31, a storage device 32, a memory 33, and a processor 34. The communication interface 31, the storage device 32, and the memory 33 are connected to the processor 34 via a signal line. The server 3 may further include an input device, such as a keyboard and a mouse, and an output device, such as a display.

The communication interface 31 is an example of a communication unit. The communication interface 31 has an interface circuit for connecting the server 3 to the communication network 4. The communication interface 31 is configured to be able to communicate with the wireless terminal 21 of the vehicle 2 via the communication network 4 and the wireless base station 5. That is, the communication interface 31 transfers, to the processor 34, a signal or the like that represents the current position of the vehicle 2, received from the wireless terminal 21 of the vehicle 2 via the wireless base station 5 and the communication network 4. The communication interface 31 transmits a vehicle dispatch instruction or the like for the vehicle 2, received from the processor 34, to the vehicle 2 via the communication network 4 and the wireless base station 5.

The storage device 32 is an example of a storage unit. The storage device 32 includes, for example, a hard disk drive or optical recording medium, and an access device. The storage device 32 stores the identification information of the vehicle 2, the current position of the vehicle 2, the identification number of each seat of the vehicle 2, and the seat arrangement and door arrangement of the vehicle 2. The storage device 32 stores map information. The storage device 32 may store a computer program for executing the seat determining process.

The memory 33 is another example of the storage unit. Examples of the memory 33 include a nonvolatile semiconductor memory and a volatile semiconductor memory. The memory 33 stores various data and other information that are generated during execution of the seat determining process.

The processor 34 is an example of a control unit. The processor 34 includes one or plurality of central processing units (CPUs) and their peripheral circuits. The processor 34 may further include another operation circuit such as a logical operation unit or a numeric operation unit. The processor 34 executes the seat determining process.

Figure 4:
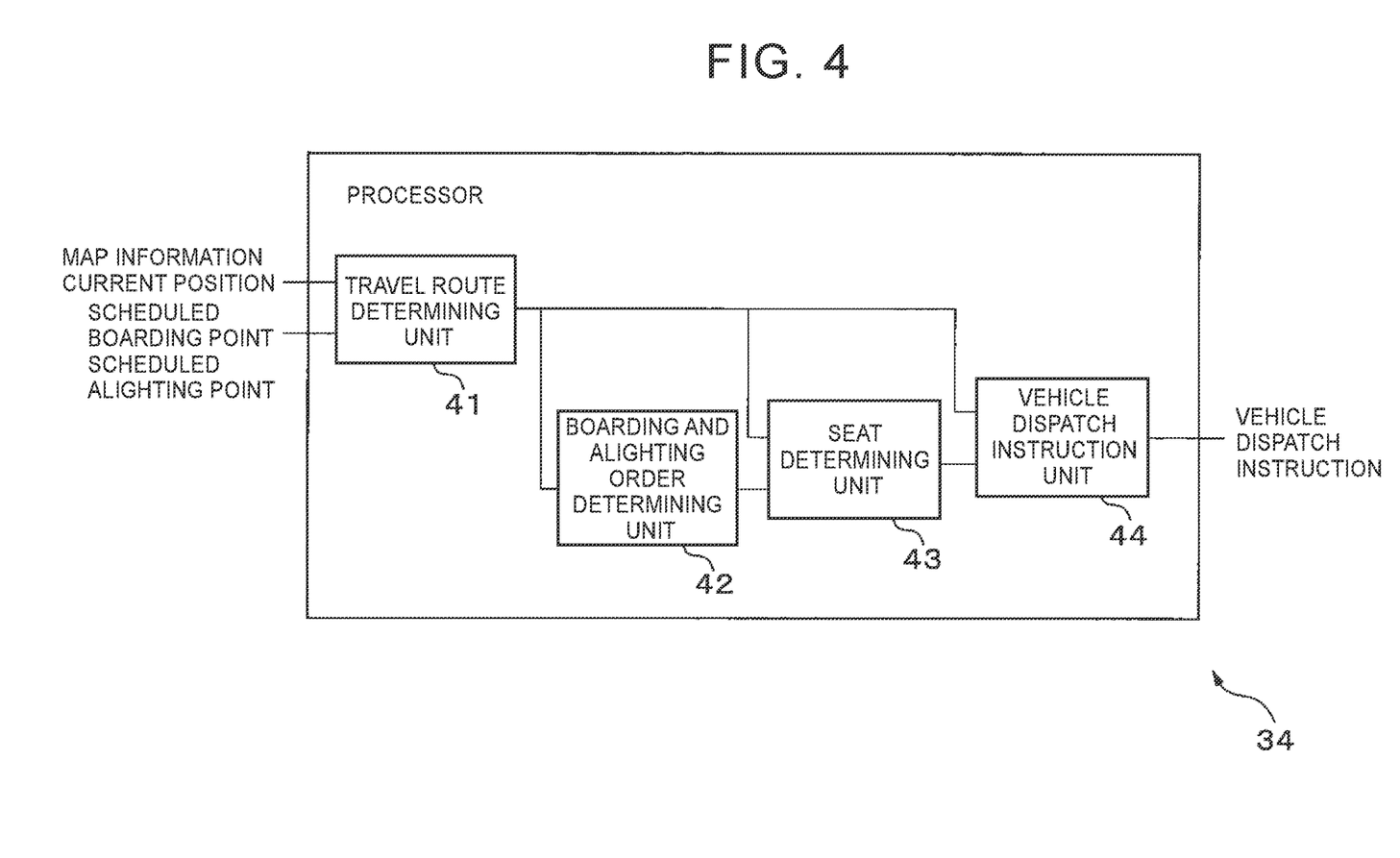
FIG. 4 is a functional block diagram of a processor of the server concerned with the seat determining apparatus.

FIG. 4 is a functional block diagram of the processor 34 concerned with the seat determining process. The processor 34 includes a travel route determining unit 41, a boarding and alighting order determining unit 42, a seat determining unit 43, and a vehicle dispatch instruction unit 44. These units of the processor 34 are, for example, functional modules that are implemented by a computer program that runs on the processor 34. Alternatively, these units of the processor 34 may be an exclusive operation circuit that is provided in the processor 34.

For example, when the vehicle 2 is available for providing a mobility service, the processor 34 executes the following processes of the units. For example, when the current position of the vehicle 2 is a predetermined standby place or when the fact that the last user riding in the vehicle 2 has got off the vehicle 2 is informed, the processor 34 just needs to determine that the vehicle 2 is available for providing a mobility service. After the processor 34 transmits a vehicle dispatch instruction to the vehicle 2, when the processor 34 receives a vehicle dispatch request from the mobile terminal of a second user and the distance between a travel route contained in the transmitted vehicle dispatch instruction and a scheduled boarding point and scheduled alighting point contained in the vehicle dispatch request received from the second user is shorter than or equal to a predetermined distance, the processor 34 may execute the following processes of the units again and re-transmit a vehicle dispatch instruction to the vehicle 2. In this case, at the point in time at which the vehicle 2 receives the re-transmitted vehicle dispatch instruction, one or more users may be already riding in the vehicle 2.

The travel route determining unit 41 determines the travel route of the vehicle 2 based on a vehicle dispatch request(s) that the server 3 has received from one or more mobile terminals via the communication network 4. At this time, the travel route determining unit 41 determines a travel route such that the vehicle 2 travels by way of the scheduled boarding point and scheduled alighting point contained in the vehicle dispatch request of each user who has requested the dispatch of a vehicle. For example, the travel route determining unit 41 just needs to determine a travel route in accordance with a predetermined route search method called Dijkstra method by consulting the map information stored in the storage device 32 such that the vehicle 2 travels by way of the scheduled boarding points and scheduled alighting points of the users and the travel route from the current position of the vehicle 2 to a point where all the users finish getting off is the shortest. Alternatively, the travel route determining unit 41 may determine a travel route such that time required to complete traveling the travel route is the shortest, instead of the travel route whose distance is the shortest. The travel route determining unit 41 may determine a travel route such that the vehicle 2 does not travel by way of the exact scheduled boarding point informed by a vehicle dispatch request from any one of users and the vehicle 2 passes within a predetermined range (for example, 100 m to 200 m) from the scheduled boarding point. For example, a highway runs within a predetermined range from a scheduled boarding point informed by a vehicle dispatch request, the travel route determining unit 41 may change the scheduled boarding point to a point where the user can get on the vehicle 2 on the highway. Alternatively, when there is a place where the vehicle 2 can be parked within a predetermined range from a scheduled boarding point informed by a vehicle dispatch request, the travel route determining unit 41 may change the scheduled boarding point to the place where the vehicle 2 can be parked. Similarly, the travel route determining unit 41 may determine a travel route such that the vehicle 2 does not travel by way of the exact scheduled alighting point informed by a vehicle dispatch request from any one of users and the vehicle 2 passes within a predetermined range from the scheduled alighting point. With this configuration, flexibility in determining a travel route increases, so the travel route determining unit 41 is able to obtain a shorter travel route, or to have a user got on or got off the vehicle 2 at a point where the user more easily gets on or gets off the vehicle 2. For a user whose scheduled boarding point or scheduled alighting point has been changed, the server 3 desirably informs the changed scheduled boarding point or scheduled alighting point to the mobile terminal of the user.

The travel route determining unit 41 informs the determined travel route and the scheduled boarding points and scheduled alighting points of users who are scheduled to ride the vehicle 2 to the boarding and alighting order determining unit 42, the seat determining unit 43, and the vehicle dispatch instruction unit 44.

The boarding and alighting order determining unit 42 determines the boarding order and alighting order of the users who are scheduled to ride the vehicle 2 in accordance with the travel route determined by the travel route determining unit 41 and the scheduled boarding points and scheduled alighting points of the users. In the present embodiment, the boarding and alighting order determining unit 42 orders the scheduled boarding points of the users from the one closer to the start point (for example, the current position of the vehicle 2) of the travel route along the travel route. The boarding and alighting order determining unit 42 determines boarding order such that the user whose scheduled boarding point is closer to the start point of the travel route is first. Similarly, the boarding and alighting order determining unit 42 determines alighting order such that the user whose scheduled alighting point is closer to the start point of the travel route is first. The boarding and alighting order determining unit 42 informs information that represents the boarding order and alighting order of the users to the seat determining unit 43. Information that represents the boarding order and alighting order of the users may be, for example, a list in which the pieces of identification information of the users are arranged in boarding order and a list in which the pieces of identification information of the users are arranged in alighting order.

The seat determining unit 43 determines seats for the users based on the boarding order and alighting order of the users who are scheduled to ride the vehicle 2. In the present embodiment, the seat determining unit 43 determines seats for the users such that, when the user gets off, the user does not cut across in front of a seat on which another user is seated.

For example, when a plurality of doors is available when users get off the vehicle 2, the seat determining unit 43 determines seats such that the users can use different doors. When seats for the users are determined in this way, even when a user who gets on the vehicle 2 first gets off the vehicle 2 later than a second user who gets on the vehicle 2 later, the user who gets off the vehicle 2 does not cut across in front of the seat on which the second user is seated.

When a plurality of users uses the same door to get off the vehicle 2 and the boarding order and the alighting order indicate that the user who gets on the vehicle 2 later gets off the vehicle 2 first, the seat determining unit 43 assigns a seat farther from the door to the user who gets on first. In other words, the seat determining unit 43 assigns a seat closer to the door to the user who gets on later. When the vehicle 2 has only one door or when the vehicle 2 has a plurality of doors but only one of the plurality of doors can be used at the alighting points of the users (for example, when the vehicle 2 has one door on each side but the alighting point of any user is on a two-way traffic road, and only one-side door can be used), a plurality of users uses the same door.

Alternatively, when a plurality of users uses the same door to get off the vehicle 2 and the boarding order and the alighting order indicate that the user who gets on the vehicle 2 first gets off the vehicle 2 first, the seat determining unit 43 just needs to determine seats for the users such that paths from the door to seats for the users are different from each other. When the seat determining unit 43 is not able to determine seats for the users such that paths from the door to seats for the users are different from each other, any of the users is required to cut across in front of a seat on which another user is seated when the user gets on or when the user gets off. In this case, the seat determining unit 43 may determine seats for the users such that a seat for a user who gets on the vehicle 2 first is farther from the door.

Figure 5A:
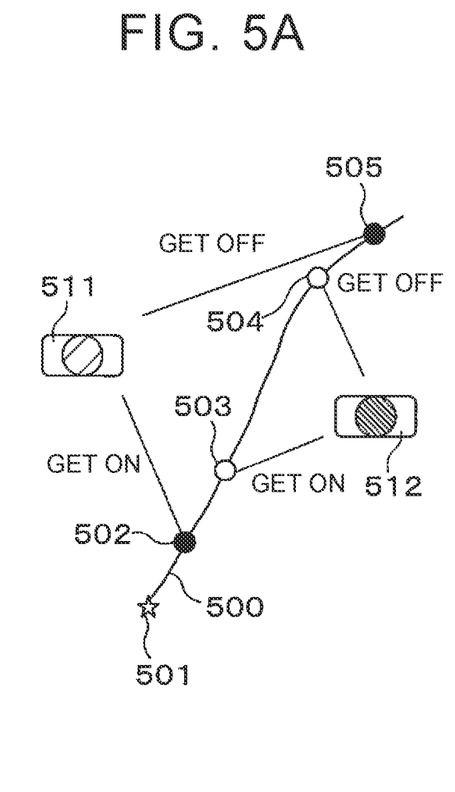
FIG. 5A is a view that shows an example of the relationship between a travel route and each of scheduled boarding points and scheduled alighting points of a plurality of users.

FIG. 5A is a view that shows an example of the relationship between a travel route and each of scheduled boarding points and scheduled alighting points of a plurality of users. In this example, a user 511 gets on at a scheduled boarding point 502 closest to a start point 501 of a travel route 500, and subsequently a user 512 gets on at a scheduled boarding point 503. After that, the user 512 gets off at a scheduled alighting point 504 earlier than the user 511, and finally the user 511 gets off at a scheduled alighting point 505. In other words, the user 512 who gets on later gets off earlier than the user 511 who gets on first.

Figure 5B:
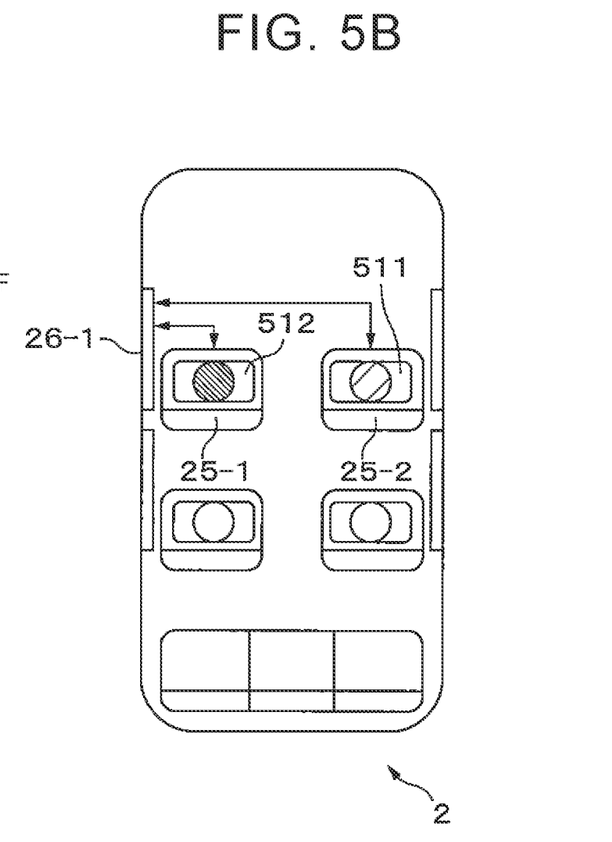
FIG. 5B is a view that shows an example of determining seats for the users, which corresponds to FIG. 5A.

FIG. 5B is a view that shows an example of determining seats for users, which corresponds to FIG. 5A. In this example, it is assumed that the user 511 and the user 512 both use the door 26-1 of the vehicle 2. In this case, the seat 25-1 and the seat 25-2 for which the door 26-1 is available are choices for seats. Other users may be seated on other seats. In this case, since the user 512 gets off first, the seat determining unit 43 determines, of the seat 25-1 and the seat 25-2, the seat 25-1 closer to the door 26-1 as a seat for the user 512. The seat determining unit 43 determines, of the seat 25-1 and the seat 25-2, the seat 25-2 farther from the door 26-1 as a seat for the user 511 who gets off later.

Figure 6A:
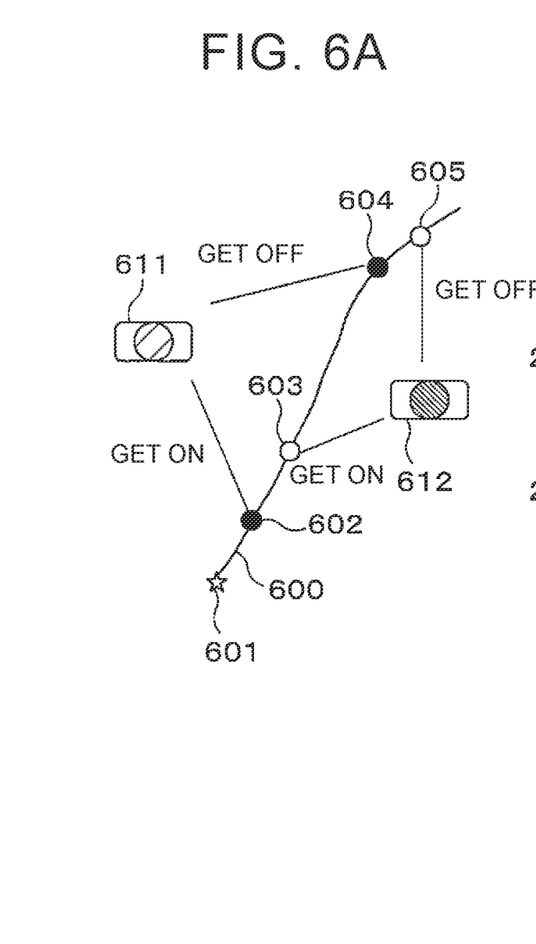
FIG. 6A is a view that shows an example of the relationship between a travel route and each of scheduled boarding points and scheduled alighting points of a plurality of users.

FIG. 6A is a view that shows another example of the relationship between a travel route and each of scheduled boarding points and scheduled alighting points of a plurality of users. In this example, a user 611 gets on at a scheduled boarding point 602 closest to a start point 601 of a travel route 600, and subsequently a user 612 gets on at a scheduled boarding point 603. After that, the user 611 who gets on first gets off at a scheduled alighting point 604 earlier than the user 612 who gets on later, and finally the user 612 gets off at a scheduled alighting point 605.

Figure 6B:
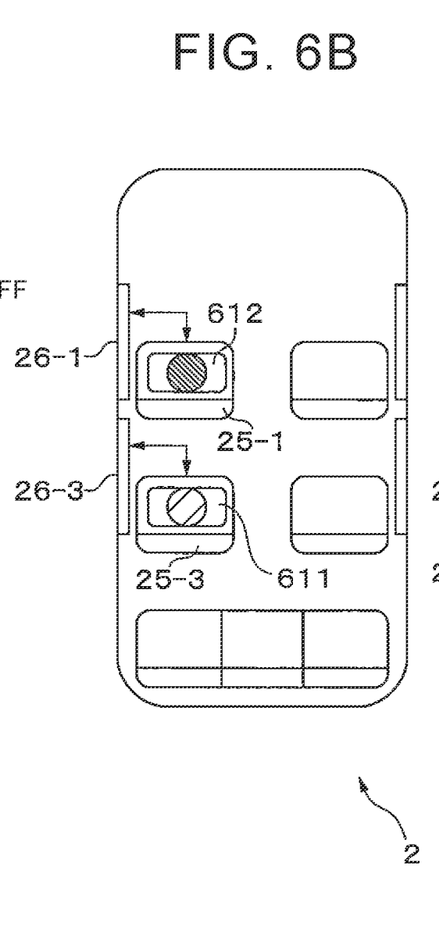
FIG. 6B is a view that shows an example of determining seats for the users, which corresponds to FIG. 6A.

FIG. 6B is a view that shows an example of determining seats for users, which corresponds to FIG. 6A. In this example, it is assumed that the two doors 26-1, 26-3 are available among the plurality of doors of the vehicle 2. In this case, the seat determining unit 43 just needs to determine seats such that the users 611, 612 can use different doors. For example, as shown in FIG. 6B, the seat determining unit 43 determines the seat 25-3 for which the door 26-3 is available as a seat for the user 611, while the seat determining unit 43 determines the seat 25-1 for which the door 26-1 is available as a seat for the user 612.

Figure 6C:
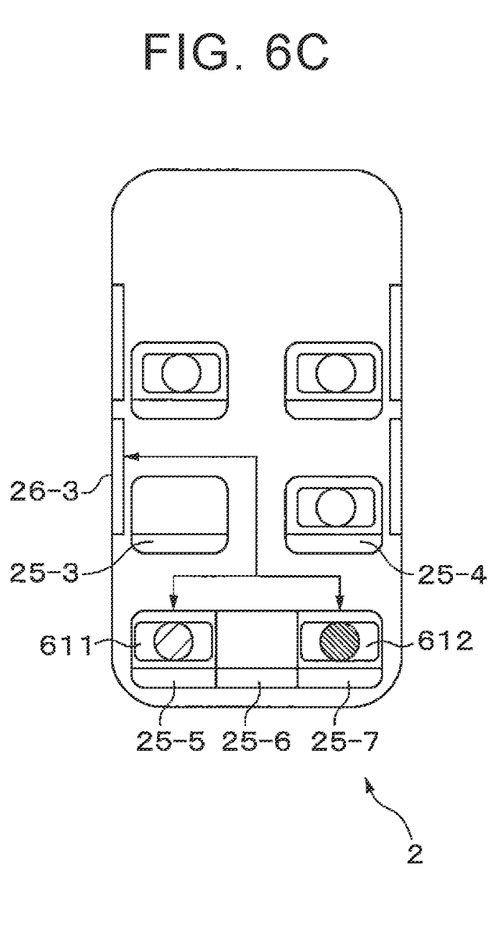
FIG. 6C is a view that shows another example of determining seats for the users, which corresponds to FIG. 6A.

FIG. 6C is a view that shows another example of determining seats for users, which corresponds to FIG. 6A. In this example, it is assumed that, of the plurality of doors 26-1, 26-2, 26-3, 26-4 of the vehicle 2, only the door 26-3 is available for both the user 611 and the user 612. In this case, the seats 25-3, 25-4, 25-5, 25-6, 25-7 for which the door 26-3 is available are choices for seats. The seat determining unit 43 determines seats for the user 611 and the user 612 such that one of the user 611 and the user 612 need not pass in front of the other user. For example, as shown in FIG. 6C, the seat determining unit 43 determines the seat 25-5 and the seat 25-7, to which paths from the door 26-3 are different from each other, respectively as seats for the user 611 and the user 612. In the examples shown in FIG. 6B and FIG. 6C as well, other users may be seated on other seats.

The seat determining unit 43 just needs to determine a door(s) and the number of doors, available for each user to get off the vehicle 2 at a scheduled alighting point of the user, by consulting the door arrangement of the vehicle 2 and the map information. For example, when the vehicle 2 has one door on each side and the scheduled alighting points of users are on a two-way traffic road, the seat determining unit 43 determines only the door on the side where there is no lane adjacent to a lane on which the vehicle 2 travels as an available door when the users get off. When any door is available as in the case where a scheduled alighting point of any one of users is a parking lot of a facility, the seat determining unit 43 just needs to determine that any door is available when the user gets off. The seat determining unit 43 just needs to determine seats for users as described above by consulting door(s) and the number of doors, available when the users get off, and the seat arrangement of the vehicle 2. As described above, when there is a second user riding in the vehicle 2 as in the case where the server 3 re-transmits a vehicle dispatch instruction, the seat determining unit 43 just needs to identify vacant seats by consulting the seat for the second user and determine seats for users based on the vacant seats. The seat for the second user is, for example, identified based on the seat for the second user, which is indicated by the vehicle dispatch instruction transmitted before.

The seat determining unit 43 associates seats for users with scheduled boarding points and scheduled alighting points of the users. The seat determining unit 43 provides the association between the seat for each user and the scheduled boarding point and the scheduled alighting point to the vehicle dispatch instruction unit 44.

The vehicle dispatch instruction unit 44 generates a vehicle dispatch instruction containing information that represents the travel route of the vehicle 2, the scheduled boarding point and scheduled alighting point of each user, and the seat for each user. The vehicle dispatch instruction unit 44 transmits the vehicle dispatch instruction to the vehicle 2 via the communication interface 31, the communication network 4, and the wireless base station 5. Information that represents a scheduled boarding point may contain, for example, the longitude and latitude of the scheduled boarding point or the facility name of the scheduled boarding point. Similarly, information that represents a scheduled alighting point may contain, for example, the longitude and latitude of the scheduled alighting point or the facility name of the scheduled alighting point. Information that represents the seat for each user may contain, for example, the identification number of coordinates corresponding to the seat for the user and the scheduled boarding point and scheduled alighting point of the user.

Figure 7:
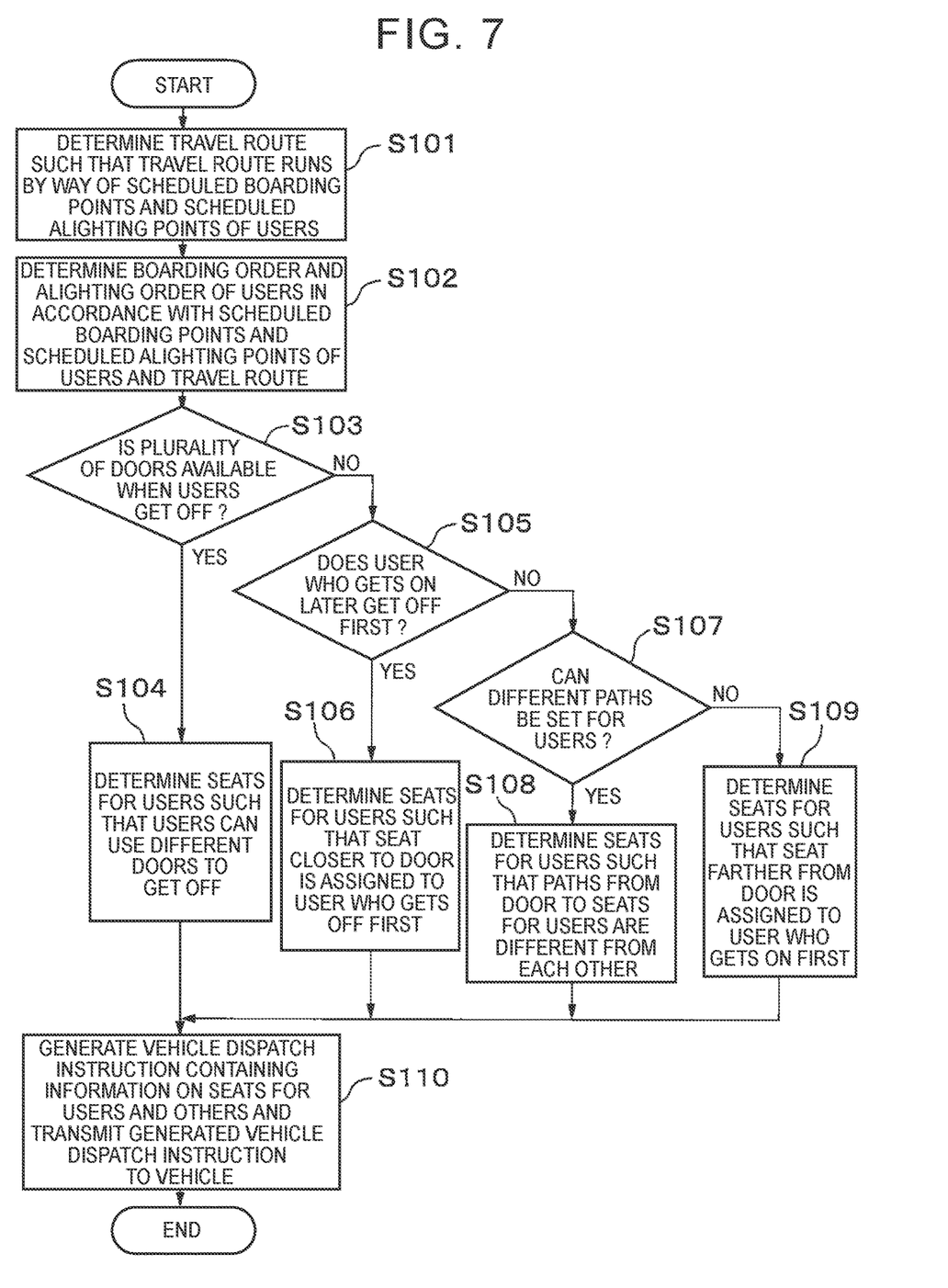
FIG. 7 is a flowchart of the operation of the seat determining process.

FIG. 7 is an operation flowchart of the seat determining process. The processor 34 executes the seat determining process in accordance with the operation flowchart described below.

The travel route determining unit 41 of the processor 34 determines a travel route such that the travel route runs by way of a scheduled boarding point and scheduled alighting point contained in a vehicle dispatch request of each user (step S101).

The boarding and alighting order determining unit 42 of the processor 34 determines the boarding order and alighting order of the users scheduled to ride the vehicle 2 in accordance with the scheduled boarding point and scheduled alighting point of each user and the travel route determined by the travel route determining unit 41 (step S102).

The seat determining unit 43 of the processor 34 determines whether a plurality of doors is available when the users get off (step S103). When a plurality of doors is available when the users get off, that is, when the users can use different doors to get off (Yes in step S103), the seat determining unit 43 determines seats for the users such that the users can use different doors to get off (step S104).

On the other hand, when only the same door is available when the users get off (No in step S103), the seat determining unit 43 determines whether the user who gets on later gets off first based on the boarding order and the alighting order (step S105). When the user who gets on later gets off first (Yes in step S105), the seat determining unit 43 determines seats for the users such that a seat closer to the door is assigned to the user who gets off first (step S106).

On the other hand, when the user who gets on first gets off first (No in step S105), the seat determining unit 43 determines whether different paths from the door to seats for the users can be set (step S107). When different paths from the door to seats for the users can be set (Yes in step S107), the seat determining unit 43 determines seats for the users such that paths from the door to seats for the users are different from each other (step S108).

On the other hand, when paths from the door to seats for the users overlap with each other (No in step S107), the seat determining unit 43 determines seats for the users such that seat farther from the door is assigned to the user who gets on first (step S109).

After step S104, step S106, step S108, or step S109, the vehicle dispatch instruction unit 44 of the processor 34 generates a vehicle dispatch instruction containing information that represents the travel route of the vehicle 2, the scheduled boarding points and scheduled alighting points of the users, and the seat for the users to the vehicle 2 via the communication interface 31, the communication network 4, and the wireless base station 5 (step S110). The processor 34 ends the seat determining process.

According to a modification, even when a plurality of doors is available when users get off, the seat determining unit 43 may determine seats for the users in accordance with the processes of step S105 to step S109. Alternatively, the seat determining unit 43 may determine whether a plurality of doors is available when users get off only when the user who gets on first gets off first, and, when a plurality of doors is available when the users get off, may determine seats for the users such that the users can use different doors to get off.

Alternatively, the seat determining unit 43 may determine seats for users simply according to the alighting order of the users. In this case, the seat determining unit 43 just needs to determine seats for the users such that a seat farther from the door to be used at the time of getting off is assigned to the user who gets off later. In this case, the boarding and alighting order determining unit 42 need not obtain the boarding order of the users.

As described above, the seat determining apparatus determines the boarding order and alighting order of a plurality of users who ride a vehicle in accordance with a travel route of the vehicle and scheduled boarding points and scheduled alighting points of the users and determines seats for the users in accordance with the boarding order and the alighting order such that, when any one of the users gets off, the any one of the users does not cut across in front of a seat on which another one of the users is seated. Thus, the seat determining apparatus allows any one of a plurality of users riding in the vehicle to easily get off when the any one of the users gets off.

Any one of users may sit on a seat different from the designated seat. In such a case, the ECU 23 may inform the user of the fact that the seat is wrong and may also inform the user of the correct seat via the display device 22 or an in-vehicle speaker (not shown). The ECU 23 may hold the vehicle 2 stopped until the user sits on the designated seat. Alternatively, the ECU 23 may move the vehicle 2 to the scheduled boarding point of the next user while the user remains seated on the seat different from the designated seat. The ECU 23 may prompt the user who has got on first to move to the correct seat by informing the user of the fact that the seat is wrong and also informing the user of the correct seat again via the display device 22 or the in-vehicle speaker (not shown) when the next user gets on the vehicle 2. The ECU 23 is able to, for example, sense the seat where the user is seated with the use of a seating sensor provided for each seat of the vehicle 2. The ECU 23 is able to determine whether a user has sat on a seat different from the designated seat by comparing the seat on which the user is seated, sensed by the seating sensor, with the seat associated with the scheduled boarding point of the user.

The processor of the ECU 23 of the vehicle 2 may execute the processes of various units of the processor 34 of the server 3, concerned with the seat determining process. In this case, the ECU 23 is another example of the seat determining apparatus. In this case, the ECU 23 receives the scheduled boarding points and scheduled alighting points of users scheduled to ride the vehicle 2 from the server 3 via the wireless terminal 21. The ECU 23 just needs to determine the travel route of the vehicle 2 based on the current position of the vehicle 2 and the scheduled boarding points and scheduled alighting points of the users by executing the process of the travel route determining unit 41. The ECU 23 just needs to determine the boarding order and the alighting order of the users by executing the process of the boarding and alighting order determining unit 42 and determine seats for the users based on the boarding order and alighting order of the users by executing the process of the seat determining unit 43. The ECU 23 stores the scheduled boarding point and scheduled alighting point of each user and the seat in association with each other. The ECU 23, for each user, just needs to inform the user of the seat associated with the scheduled boarding point via the display device 22 or another device when the vehicle 2 reaches the scheduled boarding point of the user.

A computer program for causing a computer to execute the process to be executed on the processor 34 of the server 3 may be, for example, recorded on a recording medium, such as an optical recording medium or a magnetic recording medium, and distributed.

As described above, persons skilled in the art can make various modifications depending on modes to be embodied within the scope of the disclosure.

What is claimed is:

1. A vehicle dispatch management apparatus comprising:
a processor configured to:
receive, from a server, scheduled boarding points and scheduled alighting points of each of a plurality of users scheduled to ride a vehicle, the scheduled boarding points being points at which the respective plurality of users are scheduled to get on the vehicle, the scheduled alighting points being points at which the respective plurality of users are scheduled to get off the vehicle;
determine a travel route of the vehicle such that the travel route runs by way of the scheduled boarding points and the scheduled alighting points of each of the plurality of users;
execute automatic driving control of the vehicle in accordance with the travel route;
determine an alighting order, in which the plurality of users gets off the vehicle, based on the travel route and the scheduled alighting points of each of the plurality of users;
determine whether a plurality of doors of the vehicle will be available for each particular user of the plurality of users at the scheduled alighting points;
determine a seat for each of the plurality of users according to the alighting order for each of the plurality of users and a result of the determination of whether the plurality of doors of the vehicle will be available; and
according to a result of the determination of a seat for each of the plurality of users, inform each of the plurality of users of the seat when each of the plurality of users gets on the vehicle.

2. The vehicle dispatch management apparatus according to claim 1, wherein the processor is further configured to determine the seat for each of the plurality of users such that, when any one of the plurality of users gets off the vehicle, the any one of the plurality of users does not cut across in front of a seat for another one of the plurality of users.

3. The vehicle dispatch management apparatus according to claim 2, wherein the processor is further configured to:
determine a boarding order, in which the plurality of users gets on the vehicle, based on the travel route and the scheduled boarding points of each of the plurality of users; and
when the boarding order and the alighting order indicate that, of the plurality of users, a second user who got on the vehicle earlier than a first user, is expected to get off the vehicle later than the first user, determine a seat for each of the plurality of users such that a seat for the first user is closer to a first door of the vehicle, of the plurality of doors, which the first user and the second user are to use to get off the vehicle, than a seat for the second user.

4. The vehicle dispatch management apparatus according to claim 2, wherein:
the processor is configured to further determine a boarding order, in which the plurality of users gets on the vehicle, based on the travel route and the scheduled boarding points of each of the plurality of users; and
when the boarding order and the alighting order indicate that, of the plurality of users, a second user who got on the vehicle earlier than a first user, is expected to get off the vehicle earlier than the first user, determine a seat for each of the plurality of users such that a path from a first door of the vehicle, of the plurality of doors, which the first user and the second user are to use to get off the vehicle, to a seat for the first user is different from a path from the door to a seat for the second user.

5. The vehicle dispatch management apparatus according to claim 2, wherein:
the processor is further configured to, when each of the plurality of users is allowed to use a different one of the plurality of doors to get off the vehicle, determine a seat for each of the plurality of users such that each of the plurality of users gets off from a different one of the plurality of doors; and
the processor is further configured to, when each of the plurality of users is allowed to use only the same one of the plurality of doors to get off the vehicle, determine a seat for each of the plurality of users such that, when any one of the plurality of users gets off the vehicle according to the alighting order, the any one of the plurality of users does not cut across in front of a seat for another one of the plurality of users.

6. A vehicle dispatch management method comprising:
obtaining scheduled boarding points and scheduled alighting points of each of a plurality of users scheduled to ride a vehicle, the scheduled boarding points being points at which the respective plurality of users are scheduled to get on the vehicle, the scheduled alighting points being points at which the respective plurality of users are scheduled to get off the vehicle;

determining a travel route of the vehicle such that the travel route runs by way of the scheduled boarding points and the scheduled alighting points of each of a plurality of users scheduled to ride the vehicle;

executing automatic driving control of the vehicle in accordance with the travel route;

determining an alighting order, in which the plurality of users gets off the vehicle, based on the travel route and the scheduled alighting points of each of the plurality of users;

determining whether a plurality of doors of the vehicle will be available for each particular user of the plurality of users at the scheduled alighting points;

determining a seat for each of the plurality of users according to the alighting order for each of the plurality of users and a result of the determination of whether the plurality of doors of the vehicle will be available; and according to a result of the determining a seat for each of the plurality of users, informing each of the plurality of users of the seat when each of the plurality of users gets on the vehicle.

7. A non-transitory computer readable medium having stored thereon instructions which, when executed by at least one processor, cause the at least one processor to:

receive, from a server, scheduled boarding points and scheduled alighting points of each of a plurality of users scheduled to ride a vehicle, the scheduled boarding points being points at which the respective plurality of users are scheduled to get on the vehicle, the scheduled alighting points being points at which the respective plurality of users are scheduled to get off the vehicle;

determine a travel route of the vehicle such that the travel route runs by way of the scheduled boarding points and the scheduled alighting points of each of the plurality of users scheduled to ride the vehicle;

execute automatic driving control of the vehicle in accordance with the travel route;

determine an alighting order, in which the plurality of users gets off the vehicle, based on the travel route and the scheduled alighting points of each of the plurality of users;

determine whether a plurality of doors of the vehicle will be available for each particular user of the plurality of users at the scheduled alighting points;

determine a seat for each of the plurality of users according to the alighting order for each of the plurality of users and a result of the determination of whether the plurality of doors of the vehicle will be available; and according to a result of the determination of a seat for each of the plurality of users, inform each of the plurality of users of the seat when each of the plurality of users gets on the vehicle.

8. The vehicle dispatch management apparatus according to claim 1, wherein when scheduled alighting points of the plurality of users are on a two-way traffic road, the processor is further configured to determine only a door on a side of the vehicle where there is no lane adjacent to a lane on which the vehicle travels as an available door for the users to get off the vehicle.

9. The vehicle dispatch management apparatus method according to claim 6, the method further comprising, when scheduled alighting points of the plurality of users are on a two-way traffic road, determining only a door on a side of the vehicle where there is no lane adjacent to a lane on which the vehicle travels as an available door for the users to get off the vehicle.

10. The non-transitory computer-readable medium according to claim 7, wherein the instructions, when executed by the at least one processor, further cause the at least one processor to:

when scheduled alighting points of the plurality of users are on a two-way traffic road, determine only a door on a side of the vehicle where there is no lane adjacent to a lane on which the vehicle travels as an available door for the users to get off the vehicle.

11. The vehicle dispatch management apparatus according to claim 1, wherein the processor is further configured to cause the vehicle to automatically unfasten respective seatbelts of respective users of the plurality of users, as the vehicle reaches the respective scheduled alighting points of the respective plurality of users.

12. The vehicle dispatch management apparatus according to claim 6, the method further comprising:

automatically unfastening respective seatbelts of respective users of the plurality of users, as the vehicle reaches the respective scheduled alighting points of the respective plurality of users.

13. The non-transitory computer-readable medium according to claim 7, wherein the instructions, when executed by the at least one processor, further cause the at least one processor to:

cause the vehicle to automatically unfasten respective seatbelts of respective users of the plurality of users, as the vehicle reaches the respective scheduled alighting points of the respective plurality of users.

14. The vehicle dispatch management apparatus according to claim 1, wherein the processor is further configured to inform the user of a seat for the user when the vehicle reaches the scheduled boarding points.

15. The vehicle dispatch management apparatus according to claim 1, wherein the processor is further configured to, when there is a place where the vehicle can be parked within a predetermined range from the scheduled boarding point, change the scheduled boarding point to the place where the vehicle can be parked.

16. The vehicle dispatch management apparatus according to claim 6, the method further comprising:

informing the user of a seat for the user when the vehicle reaches the scheduled boarding points.

17. The non-transitory computer-readable medium according to claim 7, wherein the instructions, when executed by the at least one processor, further cause the at least one processor to:

when there is a place where the vehicle can be parked within a predetermined range from the scheduled boarding point, change the scheduled boarding point to the place where the vehicle can be parked.

18. The vehicle dispatch management apparatus according to claim 6, the method further comprising:

informing the user of a seat for the user when the vehicle reaches the scheduled boarding points.

19. The non-transitory computer-readable medium according to claim 7, wherein the instructions, when executed by the at least one processor, further cause the at least one processor to:

when there is a place where the vehicle can be parked within a predetermined range from the scheduled boarding point, change the scheduled boarding point to the place where the vehicle can be parked.

* * * * *